(12) United States Patent
Wada et al.

(10) Patent No.: US 8,209,440 B2
(45) Date of Patent: Jun. 26, 2012

(54) DEVICE-CONFIGURATION-INFORMATION OPTIMUM ARRANGEMENT METHOD AND DEVICE-CONFIGURATION-INFORMATION OPTIMUM ARRANGEMENT SYSTEM

(75) Inventors: Yuji Wada, Kawasaki (JP); Yasuhide Matsumoto, Kawasaki (JP); Masazumi Matsubara, Kawasaki (JP); Kenji Morimoto, Kawasaki (JP); Hiroshi Otsuka, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 12/955,557

(22) Filed: Nov. 29, 2010

(65) Prior Publication Data
US 2011/0072165 A1 Mar. 24, 2011

Related U.S. Application Data

(63) Continuation of application No. PCT/JP2008/060057, filed on May 30, 2008.

(51) Int. Cl.
*G06F 3/00* (2006.01)
(52) U.S. Cl. ............ 710/8; 707/609; 707/690; 707/705; 707/769; 709/223; 709/224; 726/1
(58) Field of Classification Search .................. None
See application file for complete search history.

(56) References Cited

U.S. PATENT DOCUMENTS

| | | | |
|---|---|---|---|
| 5,546,571 A | 8/1996 | Shan et al. | 1/1 |
| 6,175,878 B1 * | 1/2001 | Seaman et al. | 719/315 |
| 7,233,957 B1 * | 6/2007 | Sheehy et al. | 1/1 |
| 7,610,371 B2 * | 10/2009 | Enqvist | 709/224 |
| 2006/0136585 A1 * | 6/2006 | Mayfield et al. | 709/224 |
| 2008/0059943 A1 * | 3/2008 | Krevs et al. | 717/103 |
| 2010/0131473 A1 * | 5/2010 | Bjork et al. | 707/690 |
| 2010/0161577 A1 * | 6/2010 | Morozov | 707/705 |
| 2010/0179939 A1 * | 7/2010 | Rangarajan et al. | 707/609 |
| 2010/0185658 A1 * | 7/2010 | Kowalski | 707/769 |
| 2011/0035512 A1 * | 2/2011 | Morimoto et al. | 710/8 |

FOREIGN PATENT DOCUMENTS

| | | |
|---|---|---|
| JP | 02-212972 | 8/1990 |
| JP | 5-12338 | 1/1993 |
| JP | 2004-296045 | 10/2004 |

OTHER PUBLICATIONS

'The Federated CMBD Vision' A Joint White Paper from BMC, CA, Fujitsu, HP, IBM, and Microsoft, Version 1.0, Jan. 25, 2007.*

(Continued)

*Primary Examiner* — Steven Snyder
(74) *Attorney, Agent, or Firm* — Greer, Burns & Crain, Ltd.

(57) ABSTRACT

A device-configuration-information integrated management system includes a device-configuration-information managing unit that manages device configuration information containing configuration items of a target device for management and contains relationships between the configuration items; and a device-configuration-information integrated managing unit for integratedly managing the device configuration information obtained from a plurality of the device-configuration-information managing units. The system also includes a device-configuration-information optimum arrangement processing unit that performs optimum management by aggregating device configuration information that contains related configuration items, from among the device configuration information managed by a plurality of the device-configuration-information managing units, in a single device-configuration-information managing unit from among a plurality of the device-configuration-information managing units.

14 Claims, 17 Drawing Sheets

OTHER PUBLICATIONS

'Technology Brief: Service Metric Analysis and Service Level Management, A CA Approach to Collecting Meaningful Metrics to Manage Service Levels' by Computer Associates, copyright 2007.*

English translation of Japanese Written Opinion of International Search Report issued in International Application No. PCT/JP2008/060057, mailed Aug. 12, 2008.

International Search Report issued in International App. No. PCT/JP2008/060057, mailed Aug. 12, 2008.

Shuichi Owa, "Functions Necessary for Operating CMS Specified by ITIL v3", Computerworld; Dec. 1, 2007; pp. 70-75.

Distributed Database; Mar. 19, 2002; [retrieval date Jul. 30, 2008]; Internet URL:http://www.icot.or.jp/ARCHIVE/Museum/SOFTWARE/KAPPA/dist.html.

* cited by examiner

FIG.3

| MDR NAME | CONFIGURATION ITEM |
|---|---|
| MDR1 | SERVER1 |
|  | SERVER2 |
|  | ⋮ |
| MDR2 | HDD1 |
|  | HDD2 |
|  | HDD3 |
|  | ⋮ |
| MDR3 | NETWORK1 |
|  | NETWORK2 |
|  | ⋮ |
| ⋮ | … |

FIG.4

| RELATIONSHIP | SOURCE (CONFIGURATION ITEM) | TARGET (CONFIGURATION ITEM) |
|---|---|---|
| REL1 | SERVER1 | HDD1 |
| REL2 | SERVER1 | HDD2 |
| REL3 | SERVER1 | NETWORK1 |
| REL4 | SERVER2 | HDD3 |
| REL5 | SERVER2 | NETWORK2 |
| REL6 | HDD1 | SERVER1 |
| REL7 | HDD2 | SERVER1 |
| REL8 | HDD3 | SERVER2 |
| REL9 | NETWORK1 | SERVER1 |
| REL10 | NETWORK2 | SERVER2 |
| ... | ... | ... |

FIG.5

| ENTITY ID | ORIGIN |
|---|---|
| GID1 | MDR1%LID1 |
| | MDR3%LID1 |
| GID2 | MDR1%LID2 |
| GID3 | MDR2%LID1 |
| ⋮ | ... |

FIG.6

| CONFIGURATION ITEM |
|---|
| SERVER1 |
| SERVER2 |
| ⋮ |

FIG.7

| CONFIGURATION ITEM | MDR NAME | RELATIONSHIP |
|---|---|---|
| SERVER1 | MDR2 | HDD1 |
| | MDR2 | HDD2 |
| | MDR3 | NETWORK1 |
| SERVER2 | MDR2 | HDD3 |
| | MDR3 | NETWORK2 |

| ENTITY ID | LOCATION |
|---|---|
| LID1 | MDR2%LID1 |
| ⋮ | ... |

LOCATION INFORMATION
MANAGING TABLE OF MDR1

| ENTITY ID | LOCATION |
|---|---|
| LID1 | MDR1%LID1 |
| ... | ... |
| LID10 | MDR1%LID10 |

DEVICE-CONFIGURATION-INFORMATION OPTIMUM ARRANGEMENT METHOD AND DEVICE-CONFIGURATION-INFORMATION OPTIMUM ARRANGEMENT SYSTEM

CROSS-REFERENCE TO RELATED APPLICATION

This application is a continuation of International Application No. PCT/JP2008/060057, filed on May 30, 2008, the entire contents of which are incorporated herein by reference.

FIELD

The embodiments discussed herein are directed to a device-configuration-information optimum arrangement method and a device-configuration-information optimum arrangement system in a device-configuration-information integrated management system.

BACKGROUND

In recent years, in the field of system-operations management, a document referred to as ITIL (registered trademark, referred to similarly hereinafter, abbreviation for Information Technology Infrastructure Library) regarding the know-how of good practices is gaining in popularity. The ITIL was made public in 1989 by CCTA (Central Computer and Telecommunications Agency) that is a British government agency. Since then, the ITIL has become the de facto international standard in the field of system-operations management.

In the ITIL context, the concept of CMDB (Configuration Management Database) has been proposed as the standard for managing the device configuration information (CI, Configuration Items) of a system. Thus, a CMDB represents a device configuration information database.

According to the concept of CMDB, in order to manage the device configuration information of a system, a device configuration information database is built as the database for managing the device configuration information of that system and the relationship between the device configuration information.

Herein, the device configuration of a system includes a large variety of items such as various hardware items as well as various software and data items. The implementation of device configuration information databases is called MDR (Management Data Repository). Thus, the MDR is used in managing device configuration information as well as the relationship between each set of device configuration information.

A device configuration information database placed at a higher layer that performs virtual integration of a plurality of MDRs is referred to as an FCMDB (federated CMDB). An FCMDB can obtain the intended device configuration information by searching across the MDRs placed under it.

Besides, an FCMDB has a reconciliation function for performing reconciliation of device configuration information. More particularly, the reconciliation function is used for integrating the same device configuration information managed with different names or with different local IDs on an MDR-by-MDR basis.

Herein, the challenge is how to efficiently obtain the intended data by searching across the plurality of lower layer databases from a higher layer database. That is, since the intended device configuration information is distributed across the plurality of databases in each lower layer, the speed of response to the search request is slow.

To solve such a problem, the conventional technology suggests, for example, tweaking the database structure and the data placement in the plurality of databases under a higher layer database or changing the data placement in databases for the purpose of enhancing the search efficiency.

That is, in the conventional technology, the device configuration information is organized at the time of data registration of the device configuration information or organized in a dynamic manner (while operating FCMDB) so that the related device configuration information gets arranged in an optimum fashion. In this way, in an FCMDB, it is ensured that the related device configuration information is promptly obtained from each MDR.

However, in the conventional technology, the following issues arise: it takes time to check for the optimum arrangement of the related device configuration information (issue of optimum arrangement check) and changes in the relationship affect the optimum arrangement (relationship issue). Meanwhile, since the relationship can be arbitrarily registered, deleted, or updated; the related device configuration information cannot be subjected a fixed optimum arrangement in advance.

Besides, when some device configuration information is moved, it becomes necessary to repeat the reconciliation operation (reconciliation issue). That not only results in poor efficiency but also makes it difficult for the registrants of device configuration information to figure out the location of the corresponding device configuration information (issue of location of device configuration information).

Patent Document 1: Japanese Laid-open Patent Publication No. 02-212972

Patent Document 2: Japanese Laid-open Patent Publication No. 05-12338

SUMMARY

According to an aspect of an embodiment of the invention, a device-configuration-information integrated management system includes a device-configuration-information managing unit that manages device configuration information containing configuration items of a target device for management and contains relationships between the configuration items; a device-configuration-information integrated managing unit for integratedly managing the device configuration information obtained from a plurality of the device-configuration-information managing units; and a device-configuration-information optimum arrangement processing unit that performs optimum management by aggregating device configuration information that contains related configuration items, from among the device configuration information managed by a plurality of the device-configuration-information managing units, in a single device-configuration-information managing unit from among a plurality of the device-configuration-information managing units.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

BRIEF DESCRIPTION OF DRAWINGS

FIG. 3 is a diagram of an exemplary device-configuration-information managing table;

FIG. 4 is a diagram of an exemplary relationship information managing table;

FIG. 5 is a diagram of an exemplary origin information managing table;

FIG. 6 is a diagram of an exemplary device-configuration-information managing table;

FIG. 7 is a diagram of an exemplary relationship information managing table;

DESCRIPTION OF EMBODIMENTS

Preferred embodiments of the present invention will be explained with reference to accompanying drawings. In the following exemplary embodiment, MDRs are used for managing the device configuration information of target devices for management and an FCMDB is used for the integrated management of the device configuration information of each MDR.

Figure 1:
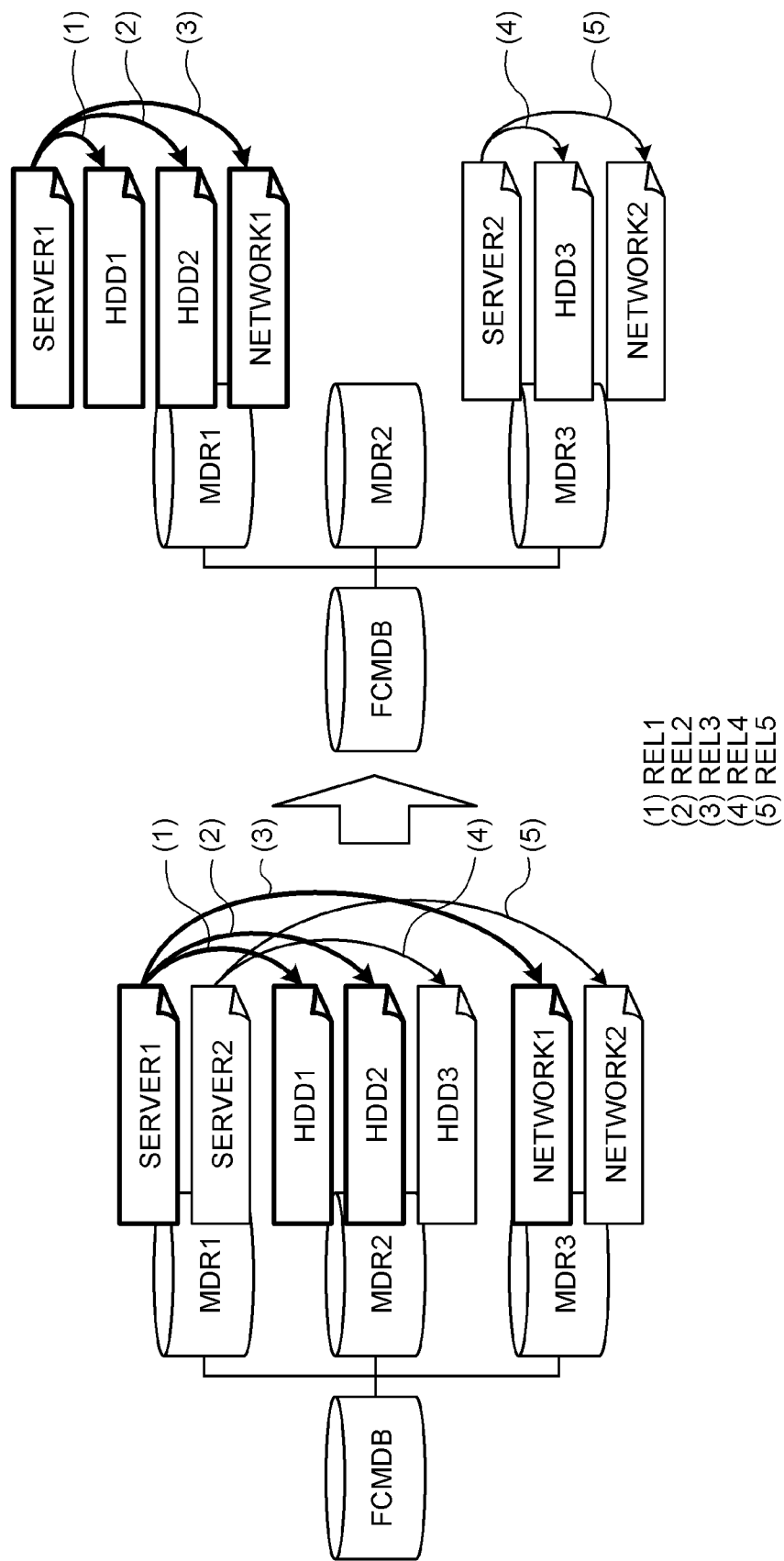
FIG. 1 is a diagram for explaining the outline and the features of an exemplary embodiment.

Firstly, described below are the outline and the features of the exemplary embodiment. FIG. 1 is a diagram for explaining the outline and the features of the exemplary embodiment. As illustrated in FIG. 1, an FCMDB integratedly manages an MDR1, an MDR2, and an MDR3.

As illustrated on the left side of the central arrow in FIG. 1, the MDR1 is used for managing "server1" and "server2" as the device configuration information. Similarly, the MDR2 is used for managing "HDD (Hard Disk Drive, referred to similarly hereinafter) 1", "HDD2", and "HDD3" as the device configuration information; while the MDR3 is used for managing "network1" and "network2" as the device configuration information.

The "server1" and the "HDD1" are related by a relationship "Rel1"; the "server1" and the "HDD2" are related by a relationship "Rel2"; and the "server1" and the "network1" are related by a relationship "Rel3". Similarly, the "server2" and the "HDD3" are related by a relationship "Rel4", and the "server2" and the "network2" are related by a relationship "Rel5".

In this way, when the mutually related sets of device configuration information are arranged in a distributed manner in a plurality of MDRs; then, in order to refer to the mutually related sets of device configuration information, it becomes necessary to search across all the MDRs, namely, the MDR1, the MDR2, and the MDR3 from the FCMDB. That leads to an increase in the turnaround time of the search result.

Thus, as illustrated on the right side of the central arrow in FIG. 1, the mutually related sets of device configuration information are subjected to optimum arrangement. More particularly, all of the device configuration information "HDD1", "HDD2" and "network1" that is relatable to the device configuration information "server1" by the relationships "Rel1", "Rel2", and "Rel3", respectively, is moved to and aggregated in the MDR1 for the purpose of optimum arrangement.

Similarly, all of the device configuration information "server2" and "HDD3" that is relatable to the device configuration information "network2" by the relationships "Rel4" and "Rel5, respectively, is moved to and aggregated in the MDR3 for the purpose of optimum arrangement.

As described above, when mutually related sets of device configuration information are aggregated in a single MDR for the purpose of optimum arrangement, performing a search of only that MDR makes it possible to obtain all the intended and mutually related sets of device configuration information. Therefore, it becomes possible to reduce the turnaround time of the search result.

Figure 2:
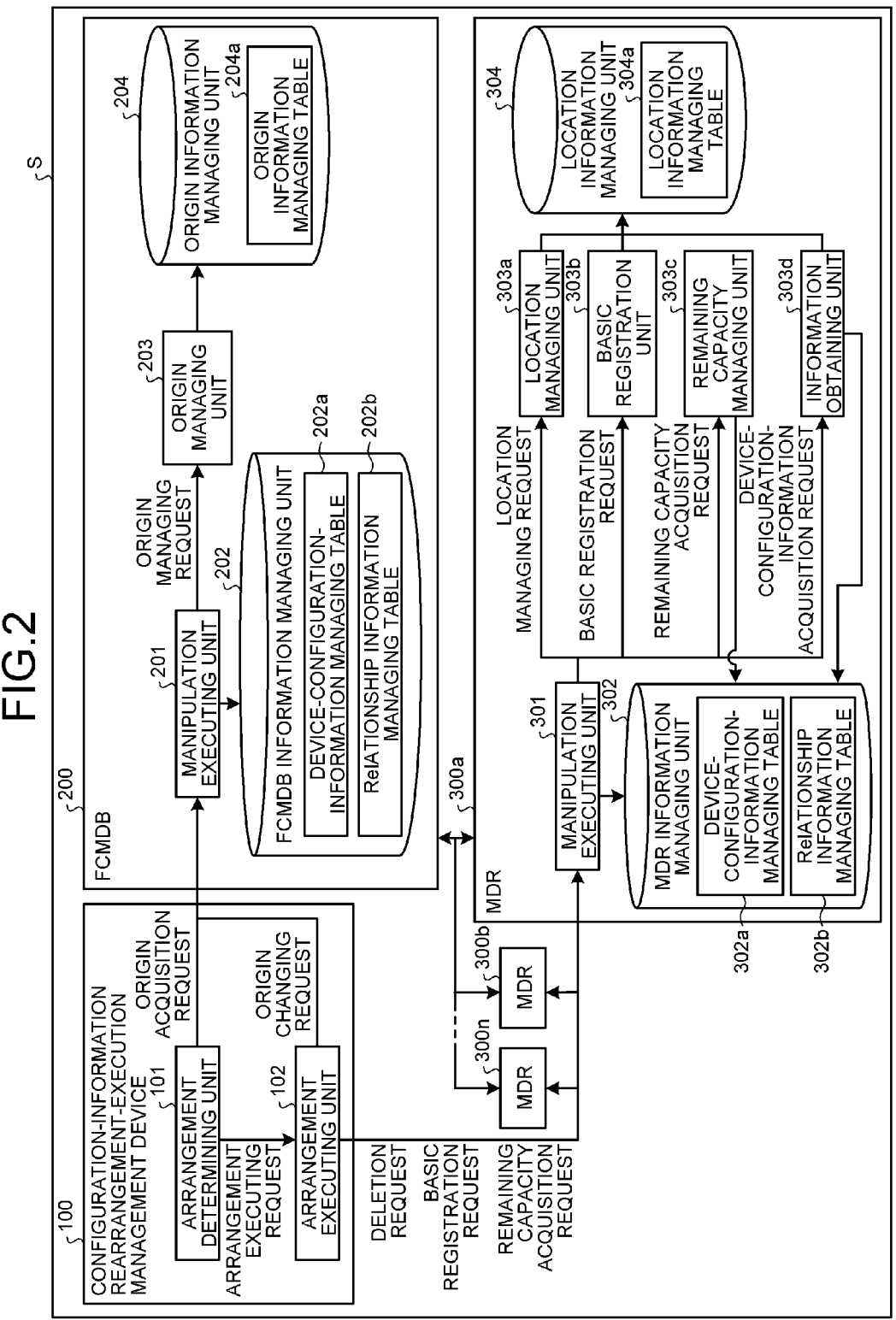
FIG. 2 is a block diagram of a configuration of a device-configuration-information integrated management system according to the exemplary embodiment.

Explained below is a configuration of a device-configuration-information integrated management system according to the exemplary embodiment. FIG. 2 is a block diagram of a configuration of the device-configuration-information integrated management system according to the exemplary embodiment. As illustrated in FIG. 2, a device-configuration-information integrated management system S includes a configuration-information rearrangement-execution management device 100, an FCMDB 200, and MDRs 300a to 300n connected in a mutually communicable manner.

The configuration-information rearrangement-execution management device 100 is connected to the FCMDB 200 and to the MDRs 300a to 300n, and performs a device-configuration-information rearrangement executing operation with respect to each MDR as well as performs device-configuration-information rearrangement management.

The configuration-information rearrangement-execution management device 100 includes an arrangement determining unit 101 and an arrangement executing unit 102. The arrangement determining unit 101 issues an acquisition request to the FCMDB 200 with the aim of obtaining origin information that indicates the MDR used for managing each set of device configuration information.

Based on the origin information received as the response from the FCMDB 200, if it is determined that each set of device configuration information is managed by a different MDR, the arrangement determining unit 101 requests the arrangement executing unit 102 to perform device-configuration-information rearrangement.

While moving a set of device configuration information that was managed by a particular MDR to another MDR, the arrangement executing unit 102 requests the particular MDR to delete that set of device configuration information and requests the other MDR to perform basic registration of that set of device configuration information.

Besides, in order to determine the destination MDR for moving a set of device configuration information, the arrangement executing unit 102 selects, for example, an MDR having the largest remaining capacity of the DB (database, referred to similarly hereinafter) resource. For that reason, the arrangement executing unit 102 requests all MDRs to inform about the respective remaining resource capacities.

The FCMDB 200 is a device for integratedly managing the device configuration information managed by each of the MDRs 300a to 300n. The FCMDB 200 includes a manipulation executing unit 201 for manipulating a variety of data managed by an FCMDB information managing unit 202 described later.

That is, the FCMDB 200 also includes the FCMDB information managing unit 202 for performing, in a virtual manner, the integrated management of the device configuration information managed by each of the MDRs 300a to 300n. The FCMDB information managing unit 202 stores therein a device-configuration-information managing table 202a and a relationship information managing table 202b.

As illustrated in FIG. 3, the device-configuration-information managing table 202a manages the information regarding the configuration items (CI) that are included in the device configuration information managed by each MDR. As illustrated in FIG. 4, the relationship information managing table 202b manages information about which relationship links which configuration items.

Meanwhile, the FCMDB 200 also includes an origin managing unit 203 for performing data manipulation of the origin information that indicates the MDR used for managing each configuration item managed in the device-configuration-information managing table 202a and includes an origin information managing unit 204 for managing the origin information.

In response to an origin managing request issued by the manipulation executing unit 201, the origin managing unit 203 performs data manipulation of the origin information managed by the origin information managing unit 204. The origin information managing unit 204 stores therein an origin information managing table 204a.

For example, as illustrated in FIG. 5, the origin information managing table 204a manages the correspondence relation between each configuration item, which is included in the configuration information identified by a globally valid ID "entity ID" in the device-configuration-information integrated management system S, and the MDR by which that configuration item is managed.

For example, regarding the configuration items included in the device configuration information having the "entity ID" as "GID (Global ID) 1", the origins are "MDR1% LID1" and "MDR3% LID1". Herein, "LID (Local ID")" represents a locally valid ID in each MDR. Moreover, "MDR1% LID1" represents "the configuration item identified by the LID1 in the MDR1" and "MDR3% LID1" represents "the configuration item identified by the LID1 in the MDR3".

The configuration of an MDR is explained with reference to the MDR 300a, which includes a manipulation executing unit 301 for manipulating a variety of data managed by an MDR information managing unit 302 described later.

That is, the MDR 300a also includes the MDR information managing unit 302, which stores therein a device-configuration-information managing table 302a and a relationship information managing table 302b.

As illustrated in FIG. 6, the device-configuration-information managing table 302a manages the information regarding the configuration items managed by the corresponding MDR. As illustrated in FIG. 7, for each configuration item, the relationship information managing table 202b manages related the configuration items along with the identification information of the respective MDRs.

Meanwhile, the MDR 300a also includes a location managing unit 303a and a basic registration unit 303b for performing data manipulation of a location information managing table 304a, which is stored in a location information managing unit 304 described later, in response to a location managing request or a basis registration request issued by the manipulation executing unit 301.

More particularly, the location managing unit 303a performs registration, updating, and deletion of location information. The basic registration unit 303b registers, in the location information managing table 304a stored in the location information managing unit 304, the location of the MDR 300a as the location information of device configuration information that has been moved from another MDR for the purpose of optimum arrangement.

Figures 8, 9:
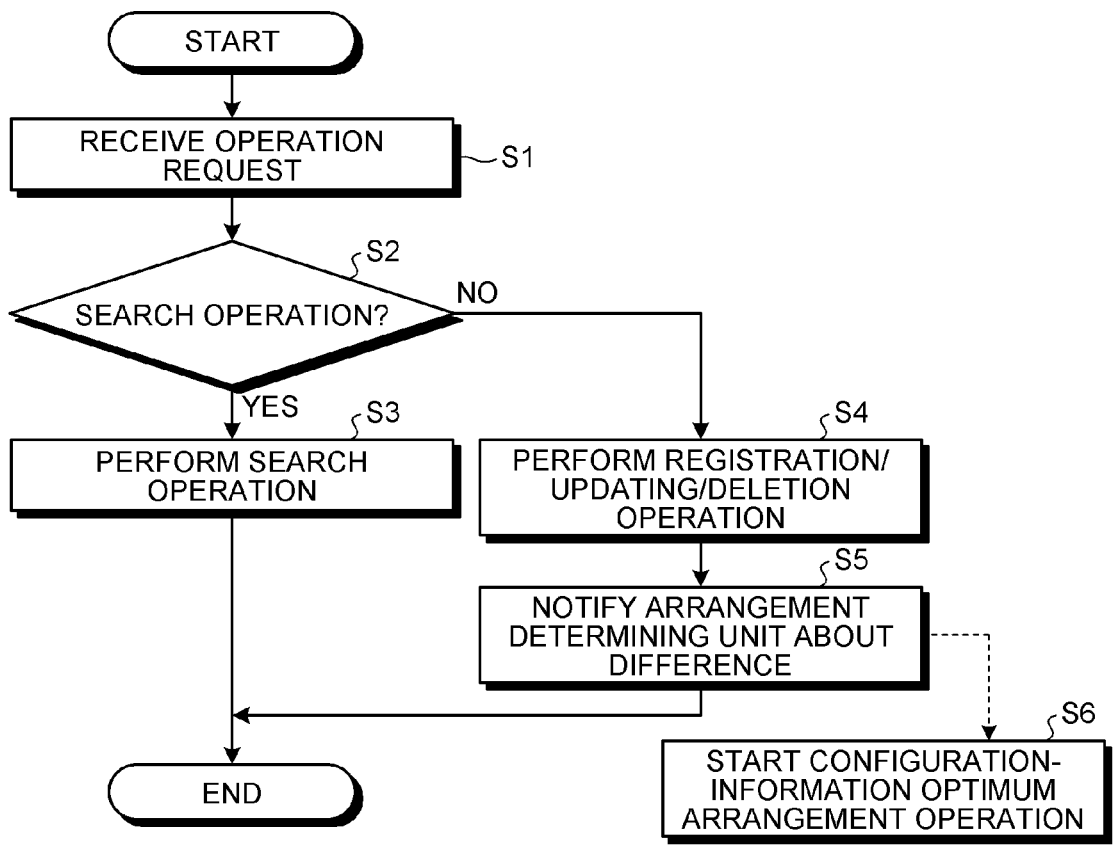
FIG. 8 is a diagram of an exemplary location information managing table.
FIG. 9 is a flowchart for explaining the sequence in the processing for executing various operation requests performed in the device-configuration-information integrated management system.

The location information managing unit 304 stores therein the location information managing table 304a that, as illustrated in FIG. 8, manages the "location" corresponding to each "entity ID". More particularly, regarding the device configuration information having the "entity ID" as "LID1", the location is "MDR2% L1D1" representing "the configuration item identified by the LID1 in the MDR2". If the table in FIG. 8 is assumed to be the location information managing table of the MDR1, then FIG. 8 indicates that "the configuration item identified by the LID1 in the MDR1 has been moved to the MDR2". If the table in FIG. 8 is assumed to be the location information managing table of the MDR2, then FIG. 8 indicates that "the configuration item identified by the LID1 is present in the MDR1 (has been moved to nowhere)".

Meanwhile, the MDR 300a also includes a remaining capacity managing unit 303c for obtaining the remaining resource capacity of the MDR information managing unit 302 in response to a remaining capacity acquisition request from the manipulation executing unit 301. Moreover, the MDR 300a includes an information obtaining unit 303d that, in response to a device-configuration-information acquisition request from the manipulation executing unit 301, refers to the device-configuration-information managing table 302a and the relationship information managing table 302b stored in the MDR information managing unit 302 and sends the result obtained by searching the device configuration information.

In case the required device configuration information is not present in the device-configuration-information managing table 302a as a result of optimum arrangement, then the information obtaining unit 303d refers to the location information managing table 304a stored in the location information managing unit 304 and obtains the required device configuration information from the destination MDR.

Described below is the processing for executing various operation requests performed in the device-configuration-information integrated management system. FIG. 9 is a flowchart for explaining the sequence in the processing for executing various operation requests performed in the device-configuration-information integrated management system. This processing is performed by the FCMDB 200.

Firstly, the manipulation executing unit 201 of the FCMDB 200 receives an operation request from the user (Step S1). Then, the manipulation executing unit 201 determines whether the received operation request is for a search operation (Step S2). If the received operation request is for a search operation (Yes at Step S2), then the manipulation executing unit 201 searches the MDRs 300a to 300n for device configuration information (Step S3).

On the other hand, if the received operation request is not for a search operation (No at Step S2), it means that the operation request is for registration/updating/deletion of device configuration information and thus the manipulation executing unit 201 performs registration/updating/deletion of the device configuration information in the MDRs 300a to 300n (Step S4).

Subsequently, the manipulation executing unit 201 notifies the configuration-information rearrangement-execution management device 100 about the difference between the status before and after performing registration/updating/deletion of the device configuration information (Step S5). Upon receiving the notification about the difference between the status before and after performing registration/updating/deletion of the device configuration information, the configuration-information rearrangement-execution management device 100 starts a configuration-information optimum arrangement operation (Step S6). The completion of Step S5 marks the end of the processing for executing various operation requests.

Figure 10:
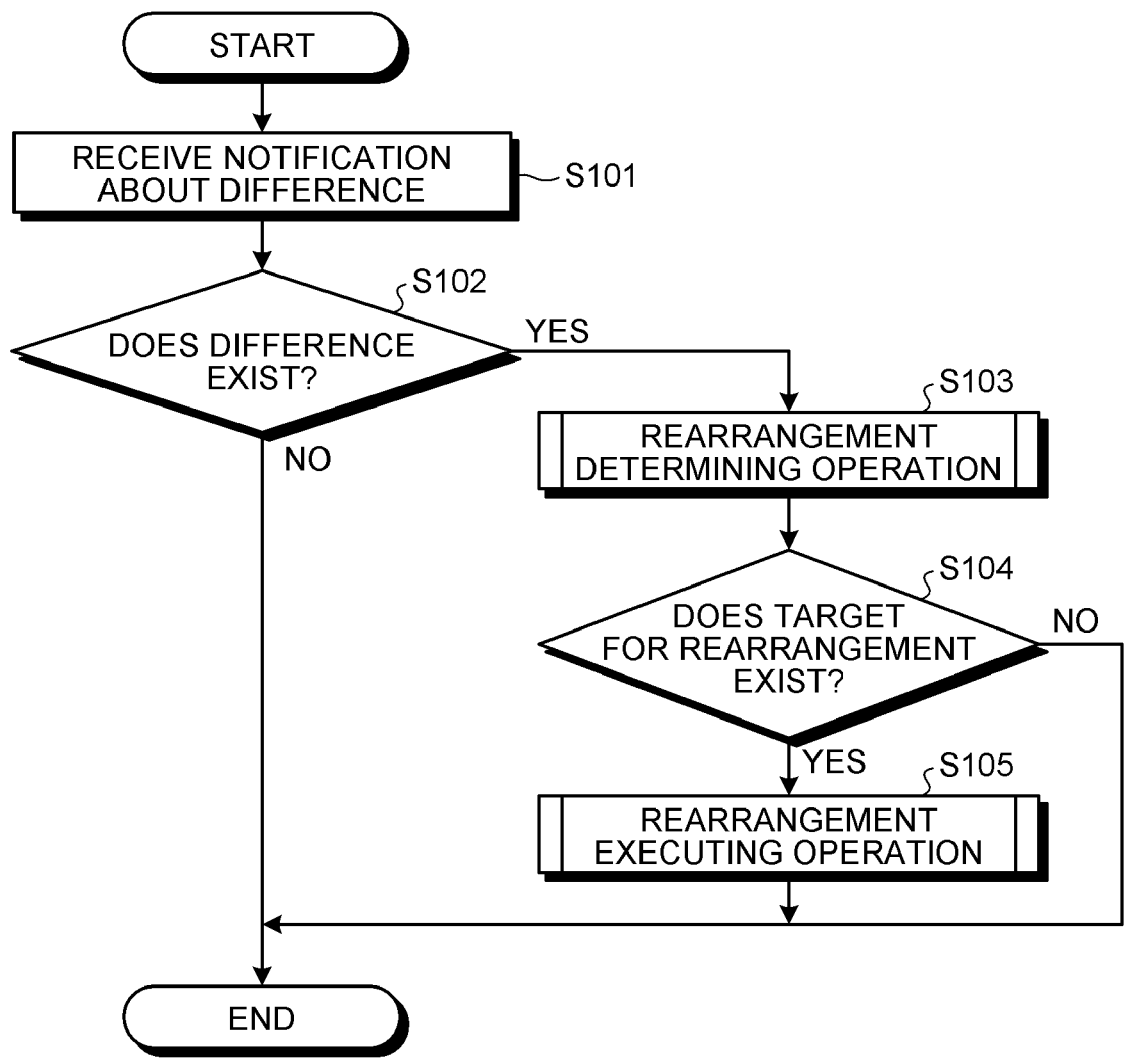
FIG. 10 is a flowchart for explaining the sequence in a configuration-information optimum arrangement operation.

Explained below is the configuration-information optimum arrangement operation. FIG. 10 is a flowchart for explaining the sequence in the configuration-information optimum arrangement operation. This operation is performed by the configuration-information rearrangement-execution management device 100.

Firstly, from the FCMDB 200, the arrangement determining unit 101 receives the notification about the difference in the device configuration information (Step S101). Then, the arrangement determining unit 101 determines whether there actually exists a difference in the device configuration information (Step S102). If it is determined that there actually exists a difference in the device configuration information (Yes at Step S102), the system control proceeds to Step S103; while if it is not determined that there actually exists a difference in the device configuration information (No at Step S102), the configuration-information optimum arrangement operation is stopped.

Figure 11:
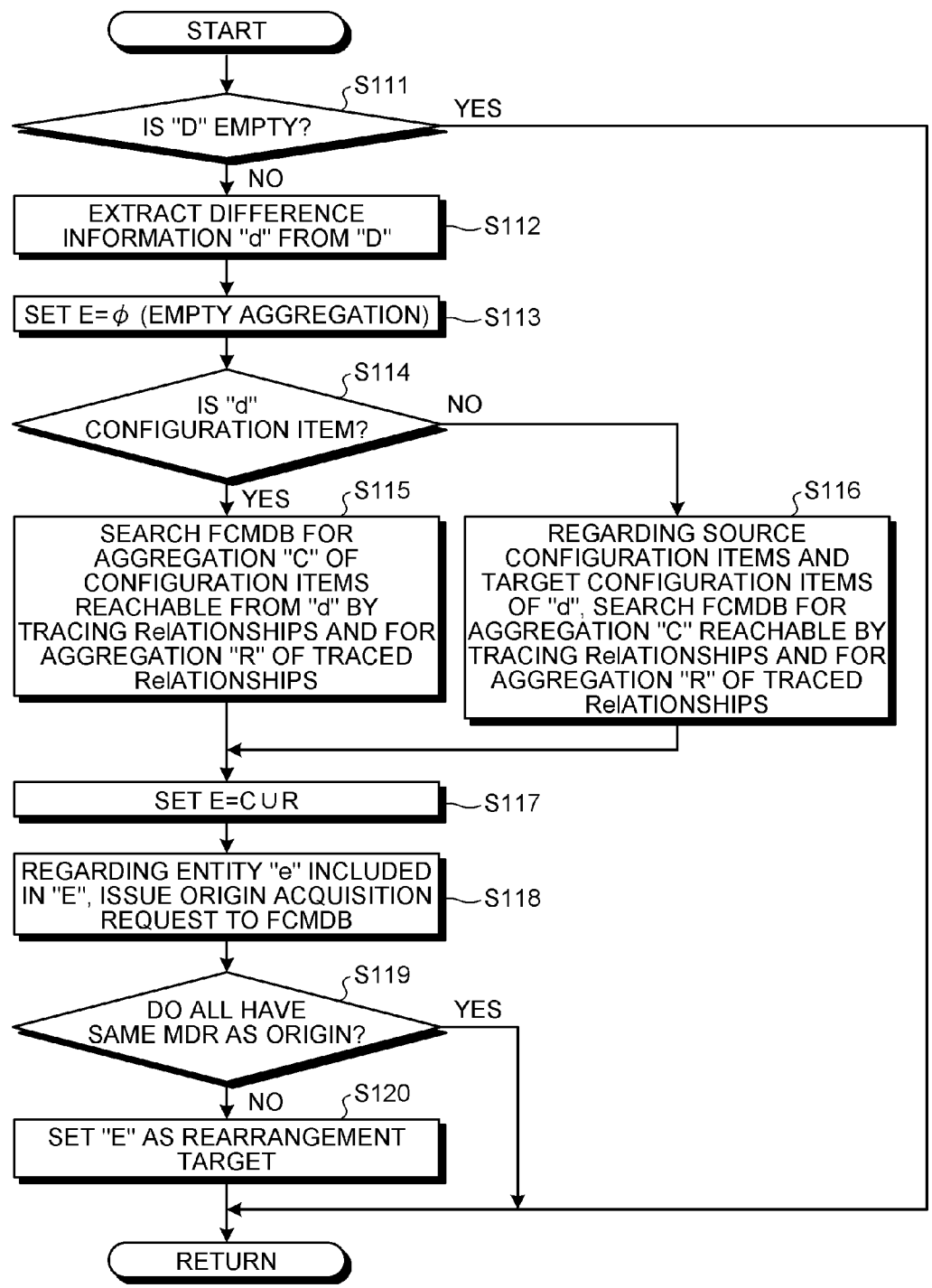
FIG. 11 is a flowchart for explaining the sequence in a rearrangement determining operation.

At Step S103, the arrangement determining unit 101 performs a rearrangement determining operation, the details of which are described later with reference to FIG. 11. Subsequently, the arrangement determining unit 101 determines whether there exists a target for rearrangement determination (Step S104). If it is determined that there exists a target for rearrangement determination (Yes at Step S104), the system control proceeds to Step S103; while if it is not determined that there exists a target for rearrangement determination (No at Step S104), the configuration-information optimum arrangement operation is stopped.

Figure 12:
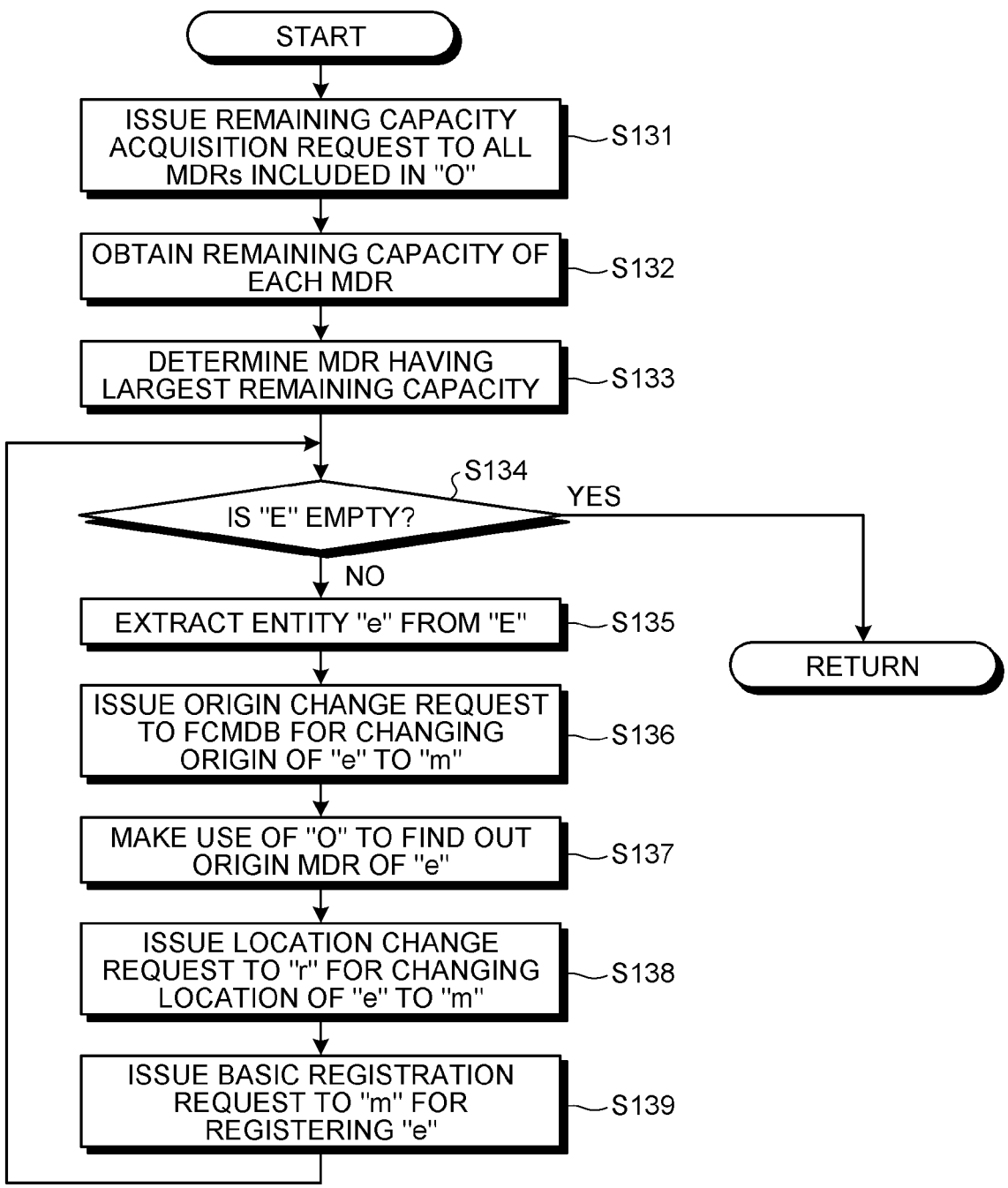
FIG. 12 is a flowchart for explaining the sequence in a rearrangement executing operation.

Then, at Step S105, the arrangement executing unit 102 performs the rearrangement executing operation, the details of which are described later with reference to FIG. 12. The completion of Step S105 marks the end of the configuration-information optimum arrangement operation.

Described below is the rearrangement determining operation. FIG. 11 is a flowchart for explaining the sequence in the rearrangement determining operation. In the following description, "D" represents the aggregation of difference information regarding the device configuration information and "d" represents an entity of "D".

Firstly, the arrangement determining unit 101 determines whether "D" is empty (empty aggregation) (Step S111). If "D" is determined to be empty (empty aggregation) (Yes at Step S111), then the rearrangement determining operation is stopped. On the other hand, if "D" is not determined to be empty (empty aggregation) (No at Step S111), then the system control proceeds to Step S112.

At Step S112, the arrangement determining unit 101 extracts difference information d from "D". Then, the arrangement determining unit 101 introduces an aggregation "E" and, as the initialization of "E", sets "E=φ (empty aggregation)" (Step S113).

Subsequently, the arrangement determining unit 101 determines whether "d" that has been extracted at Step S112 is a configuration item (Step S114). If "d" is determined to be a configuration item (Yes at Step S114), then the system control proceeds to S115; while if "d" is not determined to be a configuration item (No at Step S114), then the system control proceeds to S116.

At Step S115, the arrangement determining unit 101 searches the FCMDB 200 for an aggregation C of the configuration items that are reachable from "d" by tracing the relationships and for an aggregation R of the traced relationships. Meanwhile, at Step S116, regarding source configuration items and target configuration items of "d", the arrangement determining unit 101 searches the FCMDB 200 for an aggregation C of the configuration items that are reachable by tracing the relationships and for an aggregation R of the traced relationships. Upon completion of these steps, the system control proceeds to Step S117.

At Step S117, the arrangement determining unit 101 sets "E=C∪R". That is, the arrangement determining unit 101 sets the aggregation E as the union of the aggregation C and the aggregation R. Subsequently, regarding an entity "e" included in "E", the arrangement determining unit 101 issues an origin acquisition request to the FCMDB 200 (Step S118).

Then, the arrangement determining unit 101 determines whether all configuration items included in the origin information, which is obtained from the FCMDB 200, have the same MDR as the origin (Step S119). If all configuration items are determined to have the same MDR as the origin (Yes at Step S119), the rearrangement determining operation is stopped.

On the other hand, if all configuration items are not determined to have the same MDR as the origin (No at Step S119), then the arrangement determining unit 101 sets E as the rearrangement target (Step S120). The completion of Step S120 marks the end of the rearrangement determining operation.

Described below is the rearrangement executing operation. FIG. 12 is a flowchart for explaining the sequence in the rearrangement executing operation. In the following description, "E" represents the aggregation of related device configuration information and "O" represents the aggregation of the origin information of each entity "e" of "E".

Firstly, the arrangement executing unit 102 issues a remaining capacity acquisition request to all MDRs included in "O" (Step S131). Then, the arrangement executing unit 102 obtains the remaining capacity of each MDR (Step S132).

Subsequently, the arrangement executing unit 102 determines the MDR having the largest remaining capacity (Step S133). That MDR is referred to as "m". Then, the arrangement executing unit 102 determines whether "E" is empty (empty aggregation) (Step S134). If "E" is determined to be empty (empty aggregation) (Yes at Step S134), then the system control returns to the configuration-information optimum arrangement operation described with reference to FIG. 10. On the other hand, if "E" is not determined to be empty (empty aggregation) (No at Step S134), then the system control proceeds to Step S135.

At Step S135, the arrangement executing unit 102 extracts the entity "e" from "E". Then, the arrangement executing unit 102 issues an origin change request to the FCMDB 200 for changing the origin of "e" to "m" (Step S136).

Subsequently, the arrangement executing unit 102 makes use of "O" to find out the origin MDR of "e" (Step S137). Herein, the origin MDR of "e" is referred to by "r". Then, the arrangement executing unit 102 issues a location change request to "r" for changing the location of "e" to "m" (Step S138) and issues a basic registration request to "m" for registering "e" (Step S139). Upon completion of this step, the system control returns to Step S134.

Figure 13:
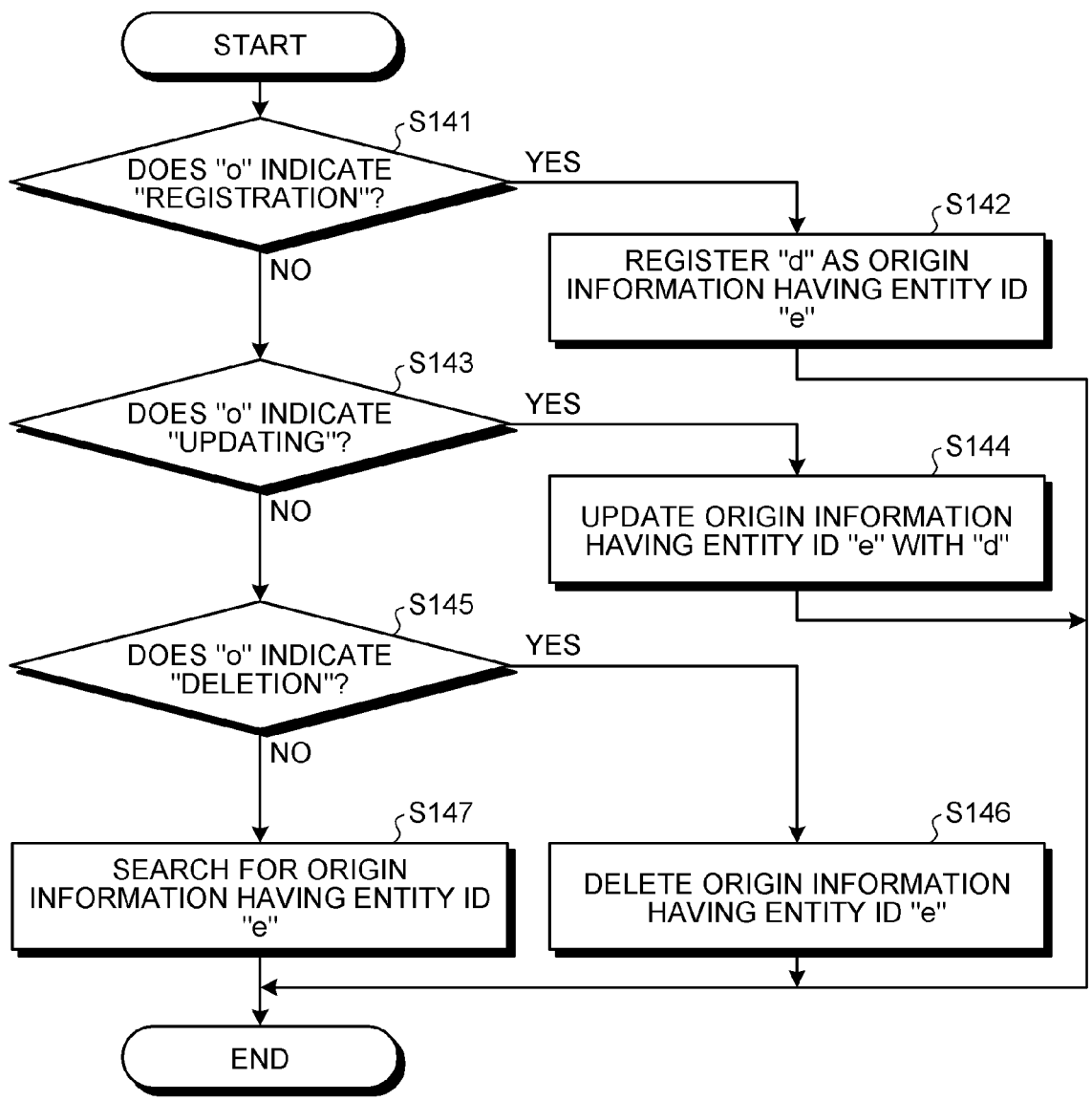
FIG. 13 is a flowchart for explaining the sequence in an origin managing operation.

Described below is an origin managing operation. FIG. 13 is a flowchart for explaining the sequence in the origin managing operation. In the following description, "o" represents the manipulation, "e" represents the entity ID, and "d" represents the origin information.

Firstly, the origin managing unit 203 of the FCMDB 200 determines whether "o" indicates "registration" (Step S141). If "o" is determined to indicate "registration" (Yes at Step S141), then the system control proceeds to Step S142; while if "o" is not determined to indicate "registration" (No at Step S141), then the system control proceeds to Step S143.

At Step S142, the origin managing unit 203 registers "d" as the origin information having the entity Id "e" in the origin information managing table 204a. At Step S143, the origin managing unit 203 determines whether "o" indicates "updating". If "o" is determined to indicate "updating" (Yes at Step S143), then the system control proceeds to Step S144; while if "o" is not determined to indicate "updating" (No at Step S143), then the system control proceeds to Step S145.

At Step S144, the origin managing unit 203 updates the origin information having the entity ID "e" with "d" in the origin information managing table 204a. At Step S145, the origin managing unit 203 determines whether "o" indicates "deletion". If "o" is determined to indicate "deletion" (Yes at Step S145), then the system control proceeds to Step S146; while if "o" is not determined to indicate "deletion" (No at Step S145), then the system control proceeds to Step S147.

At Step S146, the origin managing unit 203 deletes the origin information having the entity ID "e" from the origin information managing table 204a. At Step S147, since it can be determined that "o" indicates a search request, the origin managing unit 203 searches for the origin information having the entity ID "e".

Figure 14:
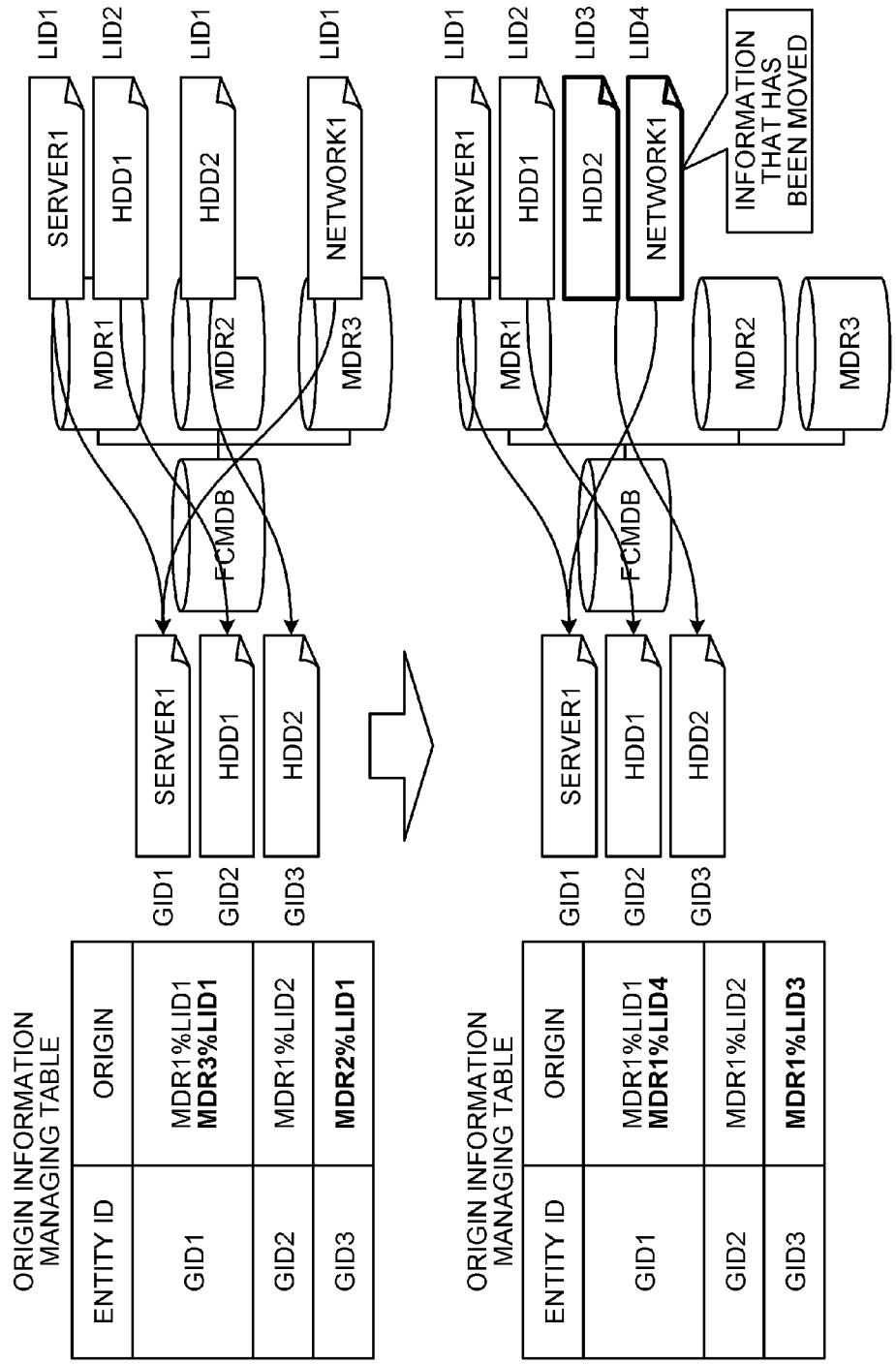
FIG. 14 is a diagram for explaining the outline of the origin managing operation.

According to the origin managing operation described above, for example, as illustrated in FIG. 14, when the "network1" and the "HDD2" are moved to the MDR1; "MDR3% LID1", which is the origin information having the entity ID "GID1", and "MDR2% LID1", which is the origin information having the entity ID "GID3", get updated to "MDR1% LID4" and "MDR1% LID3", respectively. Meanwhile, LID numbers in each MDR are assigned in the order of rearrangement execution.

In this way, since the related device configuration information is arranged by aggregation in the same MDR, it becomes possible to enhance the search speed while searching for the device configuration information.

Figure 15:
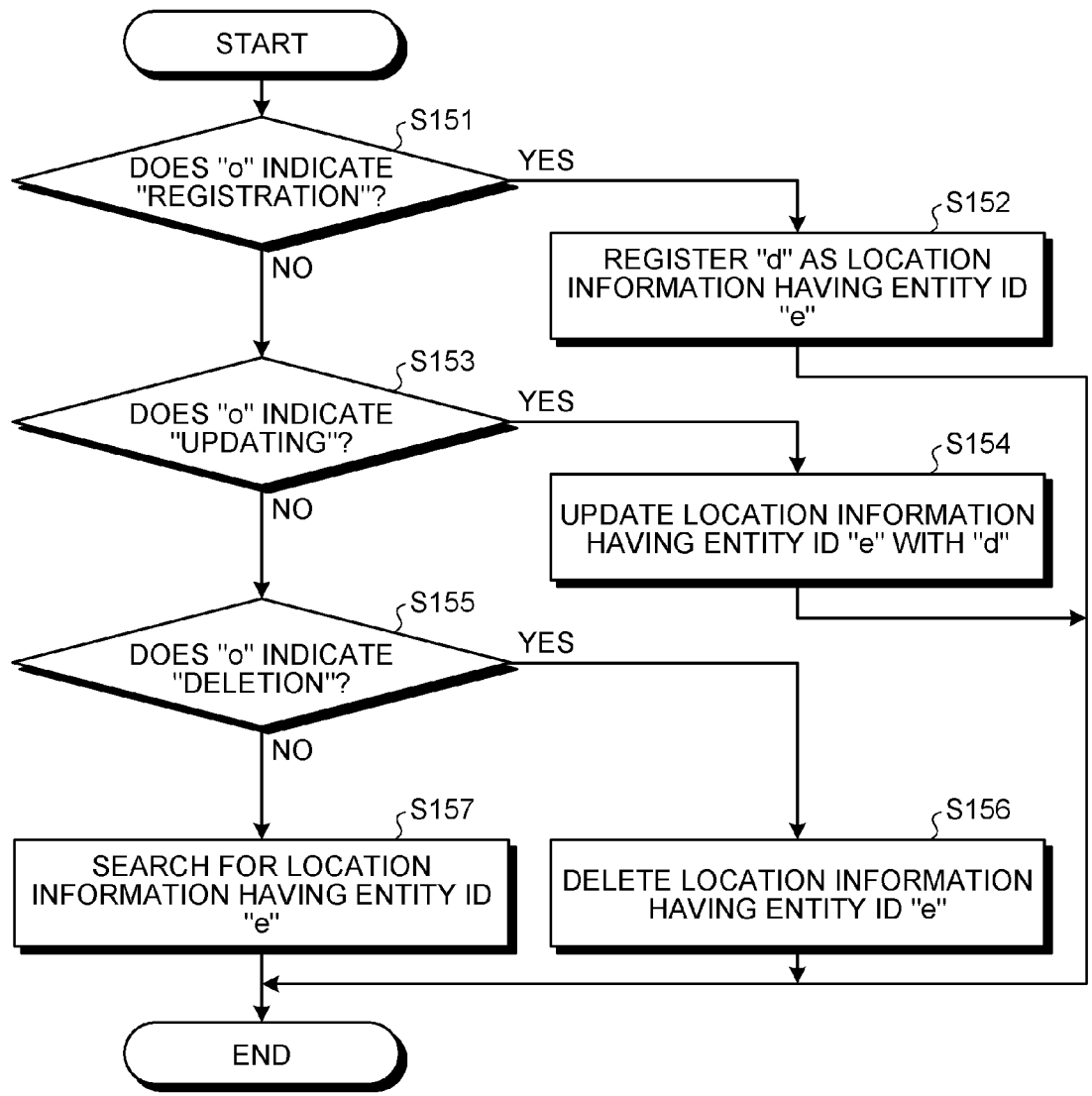
FIG. 15 is a flowchart for explaining the sequence in a location managing operation.

Described below is a location managing operation. FIG. 15 is a flowchart for explaining the sequence in the location managing operation. In the following description, "o" represents the manipulation, "e" represents the entity ID, and "d" represents the location information.

Firstly, the location managing unit 303a of the MDR 300a determines whether "o" indicates "registration" (Step S151). If "o" is determined to indicate "registration" (Yes at Step S151), then the system control proceeds to Step S152; while if "o" is not determined to indicate "registration" (No at Step S151), then the system control proceeds to Step S153.

At Step S152, the location managing unit 303a registers "d" as the location information having the entity Id "e" in the location information managing table 304a. At Step S153, the location managing unit 303a determines whether "o" indicates "updating". If "o" is determined to indicate "updating" (Yes at Step S153), then the system control proceeds to Step S154; while if "o" is not determined to indicate "updating" (No at Step S153), then the system control proceeds to Step S155.

At Step S154, in the location information managing table 304a, the location managing unit 303a updates the origin information having the entity ID "e" with "d". At Step S155, the location managing unit 303a determines whether "o" indicates "deletion". If "o" is determined to indicate "deletion" (Yes at Step S155), then the system control proceeds to Step S156; while if "o" is not determined to indicate "deletion" (No at Step S155), then the system control proceeds to Step S157.

At Step S156, from the location information managing table 304a, the location managing unit 303a deletes the location information having the entity ID "e". At Step S157, since it can be determined that "o" indicates a search request, the location managing unit 303a searches for the location information having the entity ID "e".

Figure 16:
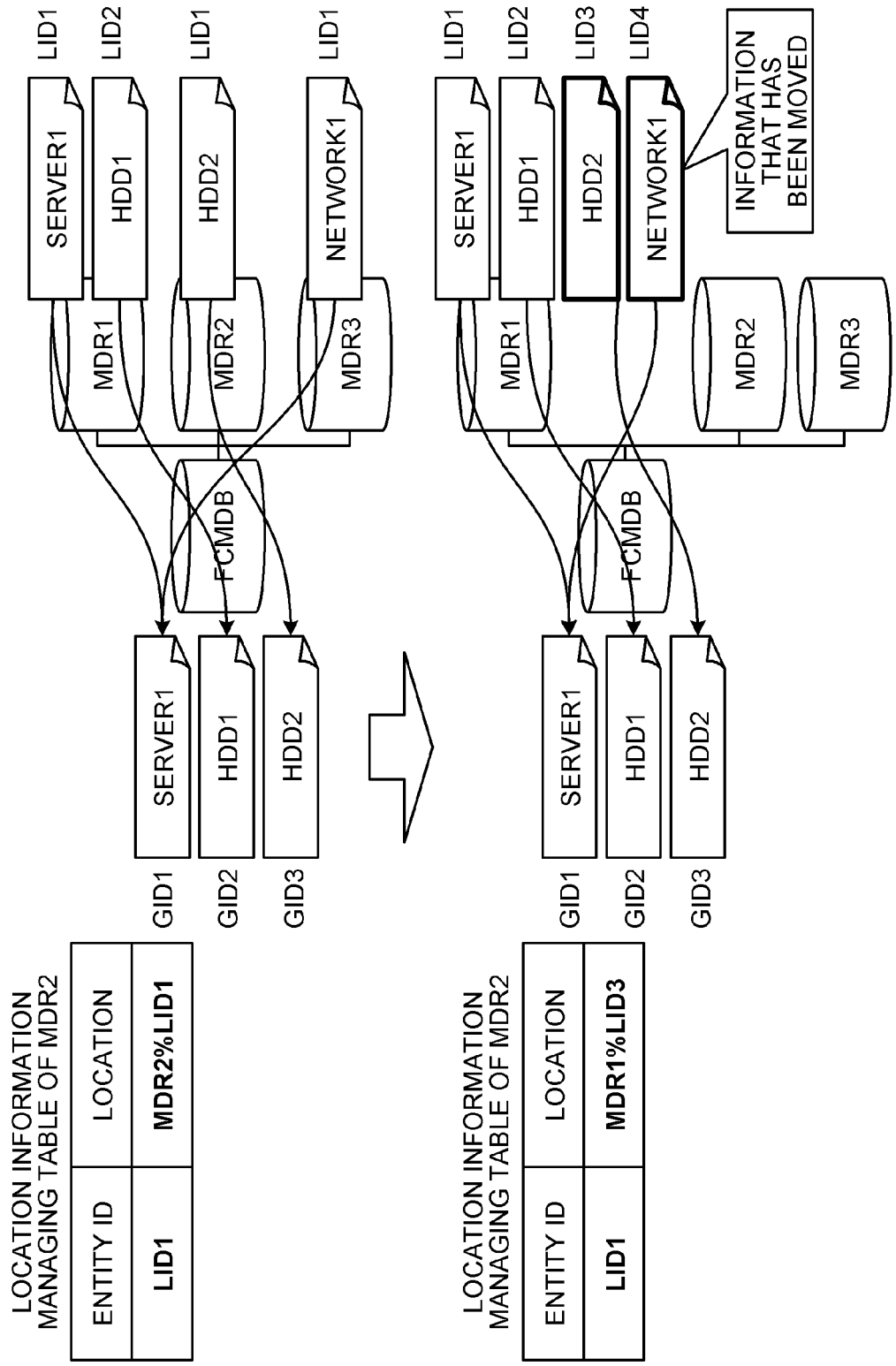
FIG. 16 is a diagram for explaining the outline of the location managing operation.

According to the location managing operation described above, for example, as illustrated in FIG. 16, when the configuration information that has the entity ID "LID1" and that is managed by the MDR2 is moved to the MDR1, the location information having the entity ID "LID1" in the location management information of the MDR2 gets updated from "MDR2% LID1" to "MDR1% LID3". In this way, even if related device configuration information is moved for the purpose of arrangement by aggregation in the same MDR, referring to the location information managing table 304a makes it possible to manage and keep track of the destinations.

Hence, in the case of attempting to refer to the device configuration information that has been moved from a particular MDR; since the destination MDR is already identified, the target for reference can be shifted to the destination MDR. That helps in preventing a situation in which the device configuration information becomes unreferable.

Figure 17:
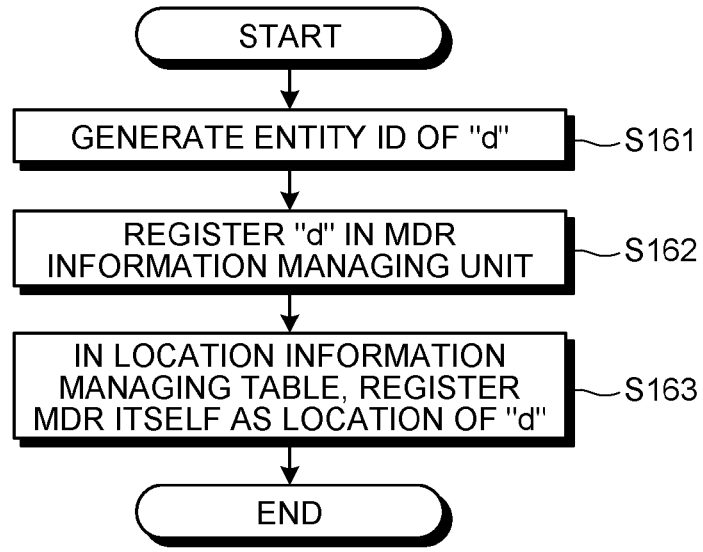
FIG. 17 is a flowchart for explaining the sequence in a basic registration operation.

Described below is a basic registration operation. FIG. 17 is a flowchart for explaining the sequence in the basic registration operation. In the following description, "d" represents the device configuration information. As illustrated in FIG. 17, firstly, the basic registration unit 303b of the MDR 300a generates an entity ID of "d" (Step S161).

Then, the basic registration unit 303b registers "d" in the MDR information managing unit 302 (in the device-configuration-information managing table 302a and the relationship information managing table 302b) (Step S162) and registers the MDR 300a as the location of "d" in the location information managing table 304a (Step S163).

Figure 18:
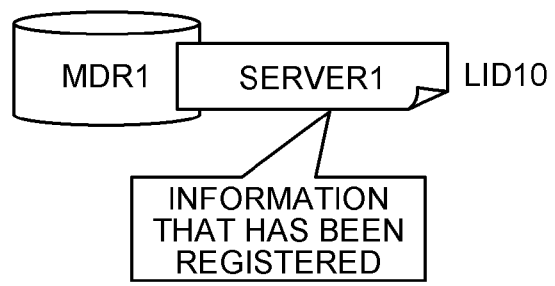
FIG. 18 is a diagram for explaining the outline of the basic registration operation.

According to the basic registration operation described above, for example, as illustrated in FIG. 18, to the device configuration information that has been newly registered or that has been moved from another MDR to the MDR1, a unique entity ID is assigned in the MDR1. Then, for example, as the location information of the device configuration information assigned with an entity ID "LID10", "MDR1% LID10" is newly registered in the location information managing table 304a.

In this way, the device configuration information that has been moved for the purpose of arrangement by aggregation in the same MDR can be managed in the location information managing table 304a in an identical manner to the already-registered device configuration information.

Figure 19:
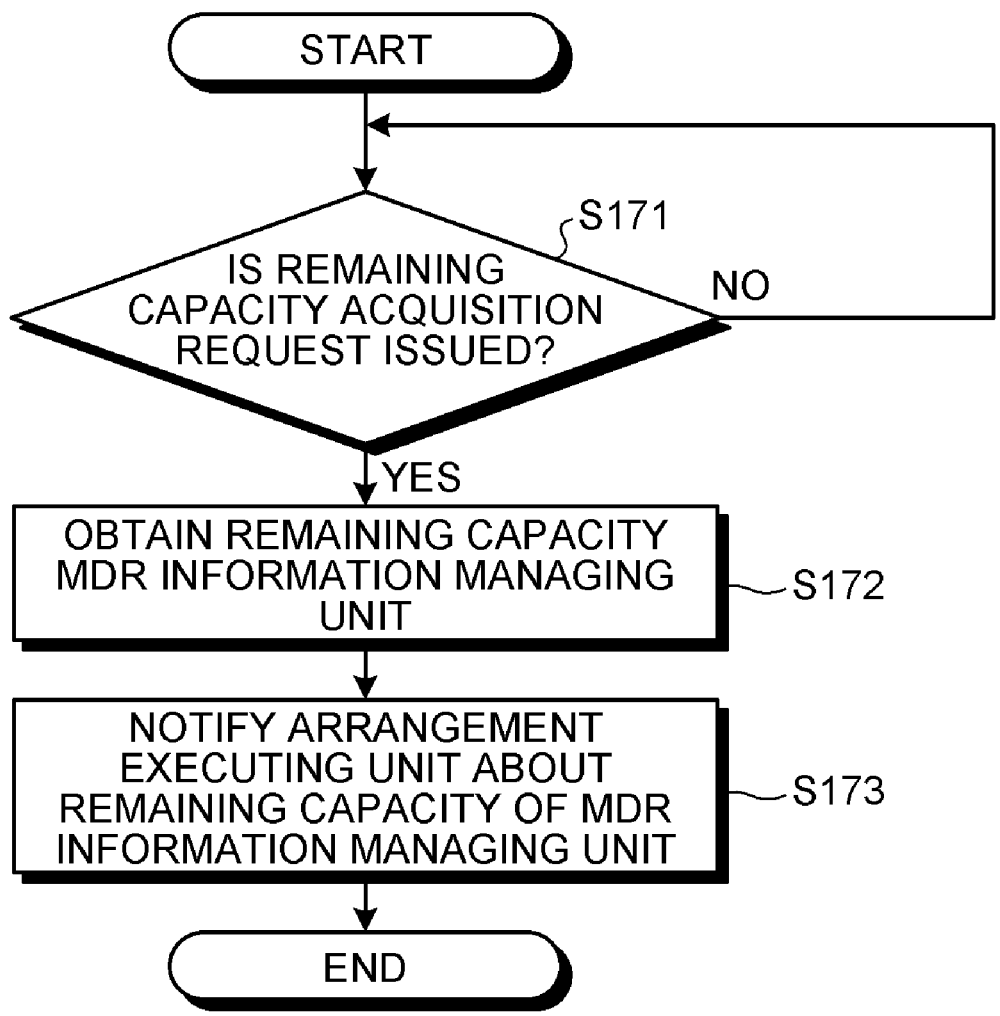
FIG. 19 is a flowchart for explaining the sequence in a remaining capacity obtaining operation for an MDR information managing unit.

Described below is a remaining capacity obtaining operation for the MDR information managing unit. FIG. 19 is a flowchart for explaining the sequence in the remaining capacity obtaining operation for the MDR information managing unit. As illustrated in FIG. 19, the manipulation executing unit 301 of the MDR 300a determines whether a remaining capacity acquisition request for the MDR information managing unit 302 is received from the arrangement executing unit 102 of the configuration-information rearrangement-execution management device 100 (Step S171).

If a remaining capacity acquisition request for the MDR information managing unit 302 is determined to have been received (Yes at Step S171), then the system control proceeds to Step S172. On the other hand, if a remaining capacity acquisition request for the MDR information managing unit 302 is not determined to have been received (No at Step S171), then Step S171 is repeated.

At Step S172, the manipulation executing unit 301 instructs the remaining capacity managing unit 303c to obtain the remaining capacity of the MDR information managing unit 302. Then, according to the instruction, the remaining capacity managing unit 303c obtains the remaining capacity of the MDR information managing unit 302 and notifies the manipulation executing unit 301 about the same (Step S172).

Subsequently, the manipulation executing unit 301 notifies the arrangement executing unit 102, which is the source of the request, about the remaining capacity of the MDR information managing unit 302 obtained from the remaining capacity managing unit 303c (Step S173). The completion of this step marks the end of the remaining capacity obtaining operation for the MDR information managing unit.

Figure 20:
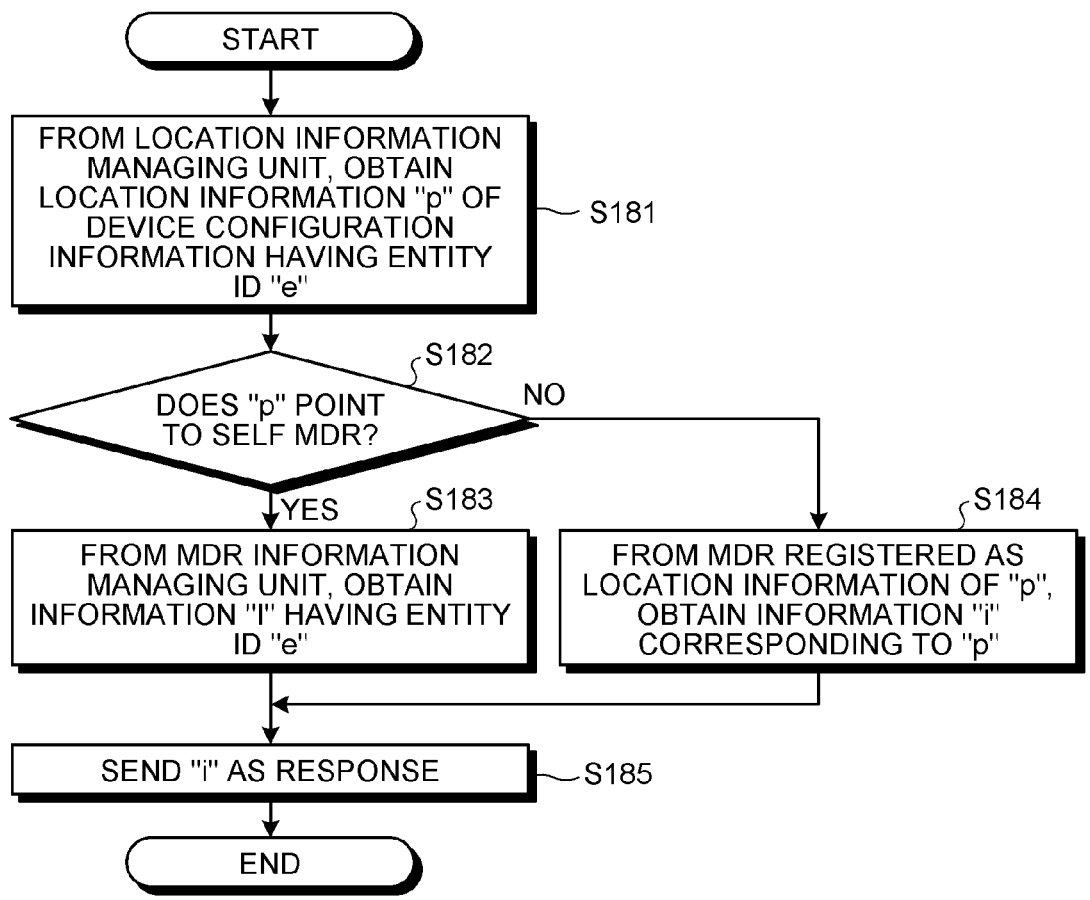
FIG. 20 is a flowchart for explaining the sequence in an information obtaining operation.

Described below is an information obtaining operation. FIG. 20 is a flowchart for explaining the sequence in the information obtaining operation. Herein, the information obtaining operation is performed by the information obtaining unit 303d according to an instruction from the manipulation executing unit 301 of the MDR 300a that is given in response to a device-configuration-information acquisition request from the FCMDB 200. In the following description, "e" represents the entity ID.

Firstly, the information obtaining unit 303d refers to the location information managing table 304a, which is stored in the location information managing unit 304, and obtains location information "p" of the device configuration information having the entity ID "e" (Step S181). Then, the information obtaining unit 303d determines whether "p" obtained at Step S181 indicates the MDR 300a (Step S182). If "p" is determined to indicate the MDR 300a (Yes at Step S182), the system control proceeds to Step S183; while if "p" is not determined to indicate the MDR 300a (No at Step S182), the system control proceeds to Step S184.

At Step S183, the information obtaining unit 303d refers to the device-configuration-information managing table 302a stored in the MDR information managing unit 302 and obtains device configuration information "i" having the entity ID "e".

Meanwhile, at Step S184, the information obtaining unit 303d refers to the location information managing table 304a and obtains the device configuration information "i" corresponding to "p" from that MDR which is registered as the location information of "p".

Subsequent to Step S183 or Step S184, the information obtaining unit 303d sends the device configuration information "i" obtained at Step S183 or Step S184 to the FCMDB 200 as the response via the manipulation executing unit 301 (Step S185).

Figure 21:
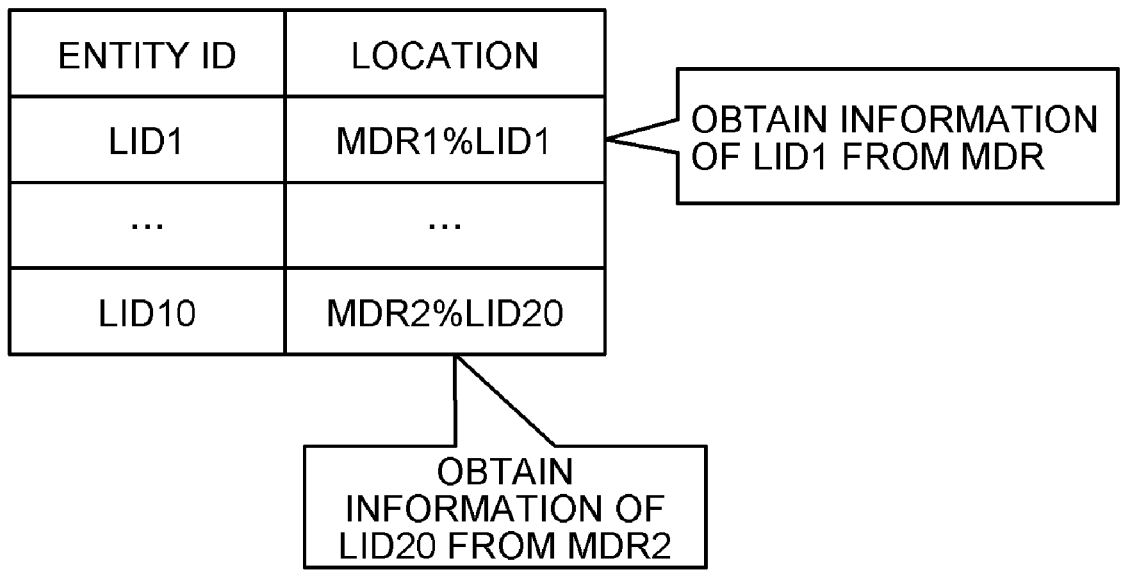
FIG. 21 is a diagram for explaining the outline of the information obtaining operation.

According to the information obtaining operation described above, for example, as illustrated in FIG. 21, the location information is known regarding all of the device configuration information that is being managed or was managed by the MDR1. Hence, the device configuration information that has the "entity ID" as "LID1" and that is still managed by the MDR1 can be obtained from the MDR1. Moreover, although the device configuration information that has the "entity ID" as "LID10" and that was managed by the MDR1 is now moved to the MDR2, it is still possible to obtain that device configuration information from the MDR2 because of the knowledge of the location information.

In this way, along with enhancing the search efficiency by aggregating the device configuration information in a single MDR; management of destination MDRs for yet-to-be-moved device configuration information and management of entity IDs in those destination MDRs allows performing a search of a source MDR for referring to already-moved device configuration information. As a result, mishit can be prevented from occurring during the search.

According to the abovementioned exemplary embodiment, the FCMDB 200 can externally find out or alter the origin MDRs of the registered device configuration information. Besides, the FCMDB 200 can also perform the optimum arrangement of device configuration information from outside. Meanwhile, regarding the registered device configuration information, only the location of that information can be altered. Moreover, the FCMDB 200 can move the device configuration information between MDRs in an efficient (speedy) manner.

The MDR 300a can perform destination management at the time of moving the device configuration information that had been registered in the MDR 300a. Moreover, the current location of the previously-registered device configuration information can be figured out. Besides, the device configuration information can be registered without having to perform reconciliation (referral).

Upon determining the optimum arrangement, finding out the device configuration information related to (having relationship with) the distributed device configuration information and determining a destination MDR for aggregating the related information makes it possible to move the device configuration information between MDRs in an efficient (speedy) manner.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth. Moreover, the effect is not limited to that stated in the exemplary embodiment.

In the abovementioned exemplary embodiment, the configuration-information rearrangement-execution management device 100 is assumed to be an external device for the FCMDB 200. However, alternatively, the configuration-information rearrangement-execution management device 100 can also be disposed inside the FCMDB 200.

In the abovementioned exemplary embodiment, the remaining resource capacity is used as the criterion for determining an MDR in which device configuration information is to be aggregated on the basis of relationships. However, alternatively, it is also possible make use of other criteria such as the access performance of resources.

Moreover, of the processes described in the abovementioned exemplary embodiment, all or part of the processes explained as being performed automatically can be performed manually. Similarly, all or part of the processes explained as being performed manually can be performed automatically by a known method. Apart from that, the processing procedures, the control procedures, specific names, various data, and information including parameters described in the abovementioned exemplary embodiment or illustrated in the drawings can be changed as required unless otherwise specified.

Furthermore, the constituent elements of each device illustrated in the drawings are merely conceptual, and need not be physically configured as illustrated. The constituent elements, as a whole or in part, can be separated or integrated either functionally or physically based on various types of loads or use conditions.

The process functions performed by each device are entirely or partially realized by a CPU (Central Processing Unit) (or by a micro controller such as an MPU (Micro Processing unit) or an MCU (Micro controller unit)) or computer programs that are analyzed and executed by the CPU (or by the micro controller such as the MPU or the MCU), or realized as hardware by wired logic.

According to a device-configuration-information optimum arrangement method and a device-configuration-information optimum arrangement system disclosed herein, when mutually related sets of device configuration information are aggregated in a single MDR on the basis of relationships for the purpose of optimum arrangement, performing a search of only that MDR makes it possible to obtain all the intended and mutually related sets of device configuration information. Therefore, it becomes possible to obtain the search result regarding the device configuration information in a speedier manner.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A device-configuration-information optimum arrangement method implemented in a device-configuration-information integrated management system that includes a device-configuration-information managing unit for managing device configuration information containing configuration items of a target device for management and containing relationships between configuration items and that includes a device-configuration-information integrated managing unit for integratedly managing the device configuration information obtained from a plurality of the device-configuration-information managing units, the device-configuration-information optimum arrangement method comprising:

managing, by the device-configuration-information managing unit, device configuration information containing configuration items of a target device for management and containing relationships between the configuration items;

integratedly managing, by the device-configuration-information integrated managing unit, the device configuration information obtained from a plurality of the device-configuration-information managing units; and performing optimum management by aggregating, by a device-configuration-information optimum arrangement processing unit, device configuration information that contains related configuration items, from among the device configuration information in a plurality of the device-configuration-information managing units, in a single device-configuration-information managing unit from among a plurality of the device-configuration-information managing units, the performing including determining, using origin information, whether it is necessary to perform optimum arrangement of the device configuration information, the origin information being used in identifying which of the device-configuration-information managing units are managing the device configuration information to be subjected to integrated management and performing the optimum management when it is determined at the determining that optimum arrangement of the device configuration information needs to be performed.

2. The device-configuration-information optimum arrangement method according to claim 1, wherein in a case of performing optimum arrangement by aggregation of the device configuration information, the performing the optimum changes the origin information of the device configuration information to a device-configuration-information managing unit set to be an aggregation destination.

3. A device-configuration-information optimum arrangement method implemented in a device-configuration-information integrated management system that includes a device-configuration-information managing unit for managing device configuration information containing configuration items of a target device for management and containing relationships between configuration items and that includes a device-configuration-information integrated managing unit for integratedly managing the device configuration information obtained from a plurality of the device-configuration-information managing units, the device-configuration-information optimum arrangement method comprising:

managing, by the device-configuration-information managing unit, device configuration information containing configuration items of a target device for management and containing relationships between the configuration items, the managing including managing a status of a management resource for the device configuration information;

integratedly managing, by the device-configuration-information integrated managing unit, the device configuration information obtained from a plurality of the device-configuration-information managing units; and performing optimum management by aggregating, by a device-configuration-information optimum arrangement processing unit, device configuration information that contains related configuration items, from among the device configuration information in a plurality of the device-configuration-information managing units, in a single device-configuration-information managing unit from among a plurality of the device-configuration-information managing units, the performing including performing the optimum management by issuing a request, with respect to the managing the status of the management resource in each of the device-configuration-information managing units that manages the device configuration information to be subjected to optimum arrangement, for a status report regarding the management resource and by determining, according to the status report regarding the management resource received from the managing the status of the management resource in each of the device-configuration-information managing units, a device-configuration-information managing unit to be used for aggregating the device configuration information.

4. A device-configuration-information optimum arrangement method implemented in a device-configuration-information integrated management system that includes a device-configuration-information managing unit for managing device configuration information containing configuration items of a target device for management and containing relationships between configuration items and that includes a device-configuration-information integrated managing unit for integratedly managing the device configuration information obtained from a plurality of the device-configuration-information managing units, the device-configuration-information optimum arrangement method comprising:

managing, by the device-configuration-information managing unit, device configuration information containing configuration items of a target device for management and containing relationships between the configuration items, the managing including managing location information used in identifying which of the device-configuration-information managing units are managing the device configuration information set to be a management target;

integratedly managing, by the device-configuration-information integrated managing unit, the device configuration information obtained from a plurality of the device-configuration-information managing units; and performing optimum management by aggregating, by a device-configuration-information optimum arrangement processing unit, device configuration information that contains related configuration items, from among the device configuration information in a plurality of the device-configuration-information managing units, in a single device-configuration-information managing unit from among a plurality of the device-configuration-information managing units, the performing including issuing a request, with respect to the managing the location information in the device-configuration-information managing units managing the device configuration information set to be the management target, to change location information of device configuration information managed at the managing the location information to a device-configuration-information managing unit set to be an aggregation destination, wherein, in response to the request regarding the location information issued at the performing the optimum management, the managing the location information includes changing location information of the device configuration information to a device-configuration-information managing unit set to be the aggregation destination.

5. The device-configuration-information optimum arrangement method according to claim 4, wherein
the managing the device configuration information by the device-configuration-information managing unit includes registering, in a case of performing optimum arrangement by aggregation of the device configuration information, device configuration information that is subjected to optimum arrangement by aggregation, in a case of performing optimum arrangement by aggregation of the device configuration information, the performing the optimum management includes issuing a request, with respect to the managing the device configuration information by the device-configuration-information integrated managing unit in a device-configuration-information managing unit set to be the aggregation destination, to perform basic registration of device configuration information that is subjected to optimum arrangement by aggregation, and in response to the request issued at the performing the optimum management, the registering includes performing basic registration of the device configuration information that is subjected to optimum arrangement by aggregation in a location information managing unit of the device-configuration-information managing unit set to be the aggregation destination.

6. The device-configuration-information optimum arrangement method according to claim 4, wherein the managing the device configuration information by the device-configuration-information managing unit includes obtaining, in response to an acquisition request regarding the device configuration information from a user and based on the location information managed at the managing the location information, the device configuration information from the configuration-information managing unit of self device or another device.

7. A device-configuration-information integrated management system comprising:

a device-configuration-information managing unit that manages device configuration information containing configuration items of a target device for management and contains relationships between the configuration items;

a device-configuration-information integrated managing unit for integratedly managing the device configuration information obtained from a plurality of the device-configuration-information managing units, a device-configuration-information optimum arrangement processing unit that performs optimum management by aggregating device configuration information that contains related configuration items, from among the device configuration information managed by a plurality of the device-configuration-information managing units, in a single device-configuration-information managing unit from among a plurality of the device-configuration-information managing units, the device-configuration-information optimum arrangement processing unit including a rearrangement determining unit that determines, using origin information, whether it is necessary to perform optimum arrangement of the device configuration information, the origin information being used in identifying which of the device-configuration-information managing units are managing the device configuration information to be subjected to integrated management and an arrangement executing unit that performs the optimum management, when the rearrangement determining unit determines that optimum arrangement of the device configuration information needs to be performed.

8. The device-configuration-information optimum arrangement system according to claim 7, wherein
in a case of performing optimum arrangement by aggregation of the device configuration information, the arrangement executing unit changes the origin information of the device configuration information to a device-configuration-information managing unit set to be an aggregation destination.

9. A device-configuration-information integrated management system comprising:
- a device-configuration-information managing unit that manages device configuration information containing configuration items of a target device for management and contains relationships between the configuration items,
- the device-configuration-information managing unit including a management-resource-status managing unit that manages a status of a management resource for the device configuration information;
- a device-configuration-information integrated managing unit for integratedly managing the device configuration information obtained from a plurality of the device-configuration-information managing units; and
- a device-configuration-information optimum arrangement processing unit that performs optimum management by aggregating device configuration information that contains related configuration items, from among the device configuration information managed by a plurality of the device-configuration-information managing units, in a single device-configuration-information managing unit from among a plurality of the device-configuration-information managing units, the device-configuration-information optimum arrangement processing unit including
- performing the optimum management by issuing a request, to the management-resource-status managing unit in each of the device-configuration-information managing units that manages the device configuration information to be subjected to optimum arrangement, for a status report regarding the management resource and by determining, according to the status report regarding the management resource received from the management-resource-status managing unit in each of the device-configuration-information managing units, a device-configuration-information managing unit to be used for aggregating the device configuration information.

10. A device-configuration-information integrated management system comprising:
- a device-configuration-information managing unit that manages device configuration information containing configuration items of a target device for management and contains relationships between the configuration items,
- the device-configuration-information managing unit including a location information managing unit that manages location information that is used in identifying which of the device-configuration-information managing units are managing the device configuration information set to be a management target;
- a device-configuration-information integrated managing unit for integratedly managing the device configuration information obtained from a plurality of the device-configuration-information managing units; and
- a device-configuration-information optimum arrangement processing unit that performs optimum management by aggregating device configuration information that contains related configuration items, from among the device configuration information managed by a plurality of the device-configuration-information managing units, in a single device-configuration-information managing unit from among a plurality of the device-configuration-information managing units, the device-configuration-information optimum arrangement processing unit including
- issuing a request, with respect to the location information managing unit in the device-configuration-information managing units managing the device configuration information set to be the management target, to change location information of device configuration information managed by the location information managing unit to a device-configuration-information managing unit set to be an aggregation destination, wherein
- in response to the request regarding the location information issued by the arrangement executing unit, the location information managing unit changes location information of the device configuration information to a device-configuration-information managing unit set to be the aggregation destination.

11. The device-configuration-information optimum arrangement system according to claim 10, wherein
- the device-configuration-information managing unit further includes a basic registration unit that registers, in a case of performing optimum arrangement by aggregation of the device configuration information, device configuration information that is subjected to optimum arrangement by aggregation,
- in a case of performing optimum arrangement by aggregation of the device configuration information, the arrangement executing unit includes issuing a request, with respect to the device-configuration-information managing unit in a device-configuration-information managing unit set to be the aggregation destination, to perform basic registration of device configuration information that is subjected to optimum arrangement by aggregation, and
- in response to the request issued by the arrangement executing unit, the basic registration unit performs basic registration of the device configuration information that is subjected to optimum arrangement by aggregation in the location information managing unit of the device-configuration-information managing unit set to be the aggregation destination.

12. The device-configuration-information optimum arrangement system according to claim 10, wherein the device-configuration-information managing unit further includes an information obtaining unit that obtains, in response to an acquisition request regarding the device configuration information from a user and based on the location information managed by the location information managing unit, the device configuration information from the device-configuration-information managing unit of self device or another device.

13. The device-configuration-information optimum arrangement method according to claim 1, wherein
- the determining determines whether it is necessary to perform the optimum arrangement of the device configuration information when there exists device configuration information for which the origin information is different.

14. The device-configuration-information optimum arrangement system according to claim 7, wherein
- the rearrangement determining unit determines whether it is necessary to perform the optimum arrangement of the device configuration information when there exists device configuration information for which the origin information is different.

* * * * *